US006661877B1

(12) United States Patent
Lee et al.

(10) Patent No.: US 6,661,877 B1
(45) Date of Patent: Dec. 9, 2003

(54) SYSTEM AND METHOD FOR PROVIDING ACCESS TO A UNIFIED MESSAGE STORE LOGICALLY STORING COMPUTER TELEPHONY MESSAGES

(75) Inventors: Jae Jun Lee, Redwood Shores, CA (US); Byung-Hee Choung, Burlingame, CA (US); Tom Charles Kraikit, San Francisco, CA (US); Jerald Duane Jensen, Castro Valley, CA (US); Varouzhan Ebrahimian, San Mateo, CA (US); Kurt Lee Christofferson, Burlingame, CA (US); Kenneth Chun Hei Kwok, San Mateo, CA (US); Himabindu Dharmavaram, San Jose, CA (US); Philip Daman Sarin, San Francisco, CA (US); Indira Iyer, San Mateo, CA (US); Sunnia Hsi-Peng Lin, Belmont, CA (US); Howard Mario Narvaez, Milipitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/898,400

(22) Filed: Jul. 3, 2001

Related U.S. Application Data

(60) Provisional application No. 60/236,613, filed on Sep. 29, 2000.

(51) Int. Cl.[7] ............................................. H04M 1/64
(52) U.S. Cl. ................ 379/67.1; 379/88.09; 379/88.13; 379/88.14; 379/88.17; 379/88.18; 379/88.25; 379/908
(58) Field of Search ...................... 379/67.1, 83, 88.04, 379/88.11, 88.13, 88.14, 88.16, 88.17, 88.18, 88.22, 88.25, 88.27, 88.28, 900, 908

(56) References Cited

U.S. PATENT DOCUMENTS

| 5,608,786 | A | * | 3/1997 | Gordon ....................... 379/100 |
| 5,675,507 | A | * | 10/1997 | Bobo, II .................. 364/514 R |
| 5,742,905 | A | * | 4/1998 | Pepe et al. ................... 455/461 |
| 6,233,318 | B1 | * | 5/2001 | Picard et al. ............ 379/88.12 |
| 6,427,002 | B2 | * | 7/2002 | Campbell et al. ........ 379/88.01 |
| 6,445,776 | B1 | * | 9/2002 | Shank et al. ............... 379/88.1 |
| 6,487,533 | B2 | * | 11/2002 | Hyde-Thomson et al. .. 704/260 |
| 6,498,835 | B1 | * | 12/2002 | Skladman et al. ....... 379/88.12 |
| 6,507,817 | B1 | * | 1/2003 | Wolfe et al. ................ 704/260 |

* cited by examiner

*Primary Examiner*—Allan Hoosain
(74) *Attorney, Agent, or Firm*—Hickman Palermo Truong & Becker LLP; Brian D. Hickman; Christopher J. Brokaw

(57) ABSTRACT

A system and method for providing access to a unified message store logically storing computer telephony messages is disclosed. A multiplicity of heterogeneous storage objects corresponding to computer telephony messages are stored in a unified message store. An application software layer exchanging the heterogeneous storage objects with a computer telephony server is exported. The computer telephony server is interfaced via a container subsystem defining encapsulated methods including organization strategy methods and storage strategy methods. A unified inbox generating an indicator for at least one of the computer telephony messages is provided. The unified inbox exports user controls for accessing the corresponding heterogeneous storage objects stored in the unified message store.

8 Claims, 10 Drawing Sheets

```
1    struct Message   {
2        VARchar  *From;
3        VARchar  *To;
4        VARchar  *Subject;
5        BOOL     *Type;
6        DATE     *Date;
7        INT      *Size;
8        VARchar  *Body;
9        VARobj   *Blob;
10   };
```

SYSTEM AND METHOD FOR PROVIDING ACCESS TO A UNIFIED MESSAGE STORE LOGICALLY STORING COMPUTER TELEPHONY MESSAGES

CROSS-REFERENCES TO RELATED APPLICATION

This patent application claims priority under 35 U.S.C. §119(e) to provisional patent application Serial No. 60/236,613, filed Sep. 29, 2000, the disclosure of which is incorporated by reference.

FIELD OF THE INVENTION

The present invention relates in general to computer telephony messaging and, in particular, to a system and method for providing access to a unified message store logically storing computer telephony messages.

BACKGROUND OF THE INVENTION

The need for complete message exchange integration has become increasingly important in the modem age of divergent electronic communications. Current electronic information exchange takes many forms. In a typical corporate setting, printed communication can take the form of electronic mail (email) and facsimiles, while recorded verbal communication can take the form of voicemails.

Each of these forms of electronic messaging presents unique advantages and trade-offs. For example, the delivery of email is assured, provided the email address is correct and current, and the email server is available. Email can be sent as a secure communication and delivery also can be confirmed by return email receipt. However, email is typically downloaded from an email server and stored locally on a user computer system. Ubiquitous access is consequently constrained by the necessity of having access to the local email store.

By comparison, the actual delivery of facsimile messages is a manual process and is inherently unreliable, as physical paper facsimiles can be lost, misdirected, or not received due to transmission failure. The delivery of facsimiles can be confirmed via facsimile protocols. Facsimile messaging, however, is the least accessible form of electronic message exchange, as a dedicated telephone number is required, the received facsimiles are not typically stored in an exchangeable digital electronic format, and delivery requires the handling of physical printed paper copies. Moreover, secure facsimiles only protect the transmission process and not actual delivery.

Finally, the delivery of voicemail, as conventionally implemented with most voicemail messaging systems, is assured and inherently confirmed upon recordation into a voicemail messaging system. Voicemail messaging offers the most accessible form of electronic messaging as voicemail messages can be retrieved over most available telephone lines.

Recent advances in standardizing message storage formats have enabled facsimile and voicemail messages to be stored in a unified message store. Unified messaging solutions allow the digital electronic message representations to be consolidated into a logically unified message exchange system. The use of digital messaging representations allows different types of messages to be accessed by a variety of compatible devices, including conventional email applications, Web browsers, telephones, personal data assistants (PDAs), and Wireless Access Protocol (WAP)-enabled devices, as well as facsimile machines (receive only).

Although convenient, digital electronic messaging for voicemail, facsimile and email present a number of unique challenges. First, each of these message types has different storage requirements. Until recently, these formats were not standardized and tended to be proprietary solutions with different physical playback requirements. Moreover, generalized solutions tend to be restricted to one storage format and fail to present a complete solution. For instance, an email store has different characteristics than would be used with a relational database, Internet file system, or Web database.

The first generation of digital electronic messaging systems recognized the need to maintain each type of electronic message, email, facsimile and voicemail, in a separate message store. These systems used message store synchronization as an add-on to conventional messaging systems. These storage systems were not standardized and messages were accessed using an ad hoc collection of message-specific applications. As well, the user interfaces and physical playback requirements varied based on the message type. For example, email messages were viewable via an email application, while voicemail messages required a separate audio playback application. Moreover, each of these applications tended to be proprietary and lacked integration with other messaging systems. As well, synchronization was difficult to achieve and the user experience varied greatly, based on the form of application used for each different message format.

Second generation attempts at integrating digital electronic messaging systems resolve the ad hoc approach in favor of a logically consolidated messaging application. Various messages types originating from heterogeneous computer telephony devices, including emails, facsimiles, and voicemails, are accessed through a virtually consolidated inbox. However, the individual messages are still separately maintained in their own legacy message stores. This approach imposed an administrative burden on maintaining each individual system and increased the overall system complexity necessary to dynamically process messaging requests through each of the separate message stores. Although an advancement over the first generation, the consolidated view approach failed to provide a flexible solution for accessing multiple storage devices and formats.

Therefore, there is a need for a unified solution capable of displaying and navigating through multiple types of digital electronic messages stored in a single unified message store. Such an approach provided a transparent, device-independent solution to accessing messages originating from physically interfaced heterogeneous computer telephony devices.

SUMMARY OF THE INVENTION

The present invention provides a Web based unified message inbox for accessing computer telephony messages stored in a unified message store. The Unified message inbox is presented as a graphical user interface with controls for displaying and navigating through the stored messages, including email, facsimiles, voice mail, and video mail. The unified inbox provides transparent access to messages exchanged with physically interfaced heterogeneous computer telephony devices.

An embodiment of the present invention is a system and method for providing access to a unified message store logically storing computer telephony messages. A multiplicity of heterogeneous storage objects corresponding to computer telephony messages are stored in a unified message store. An application software layer exchanging the heterogeneous storage objects with a computer telephony server is exported. The computer telephony server is interfaced via a container subsystem defining encapsulated methods including organization strategy methods and storage strategy methods. A unified inbox generating an indicator for at least one of the computer telephony messages is provided. The unified inbox exports user controls for accessing the corresponding heterogeneous storage objects stored in the unified message store.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 is a data structure of a pseudo code information header for computer telephony messages stored in the unified message store of FIG. 1.

DETAILED DESCRIPTION

Figure 1:
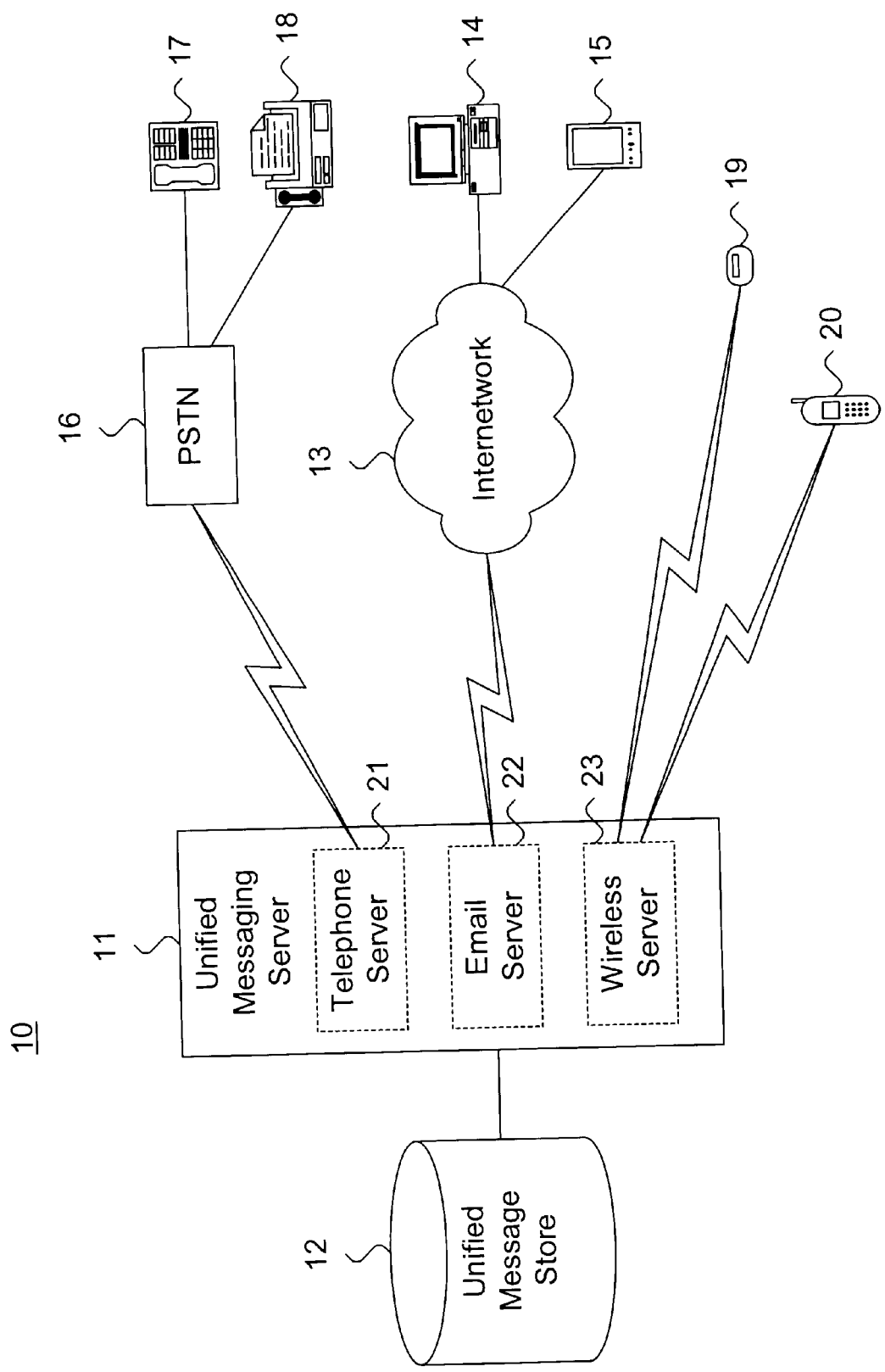
FIG. 1 is a network diagram showing a heterogeneous communications environment, including a system for providing access to a unified message store logically storing computer telephony messages, in accordance with the present invention.

FIG. 1 is a network diagram showing a heterogeneous communications environment 10, including a system 11 for providing access to a unified message store 12 logically storing computer telephony messages, in accordance with the present invention. The unified messaging server 11 is a logical collection of individual servers, including a telephone server 21, email server 22 and wireless server 23, which respectively enable a plurality of heterogeneous computer telephony devices, including a computer system 14, personal data assistant 15 (or WAP-enabled device) to access digital electronic messages maintained in the unified message store 12 over an internetwork 13 or intranetwork (not shown). As well, telephony devices, including a telephone 17 and facsimile 18, can likewise access the unified message store 12 through a publicly-switched telephone network (PSTN) 16. Finally, short messaging service (SMS)-enabled devices, such as pagers 19 and cellular telephones 20, can access the unified message store 12 over an SMS network (not shown).

Internally, the infrastructure required to support each of these heterogeneous devices is brokered by the unified messaging server 11. For example, message access using the computer system 14 is provided by implementations of the simple mail transfer protocol (SMTP), standard mail protocol servers (IMAP4 and POP3), and browser-based thin clients (HTML and WML). Likewise, the SMS-capable devices can be supported through wireless notification gateways (SMS and WCTP). Various network topologies and configurations and other types of digital electronic message exchange devices could be provided herein, as would be recognized by one skilled in the art.

Figure 2:
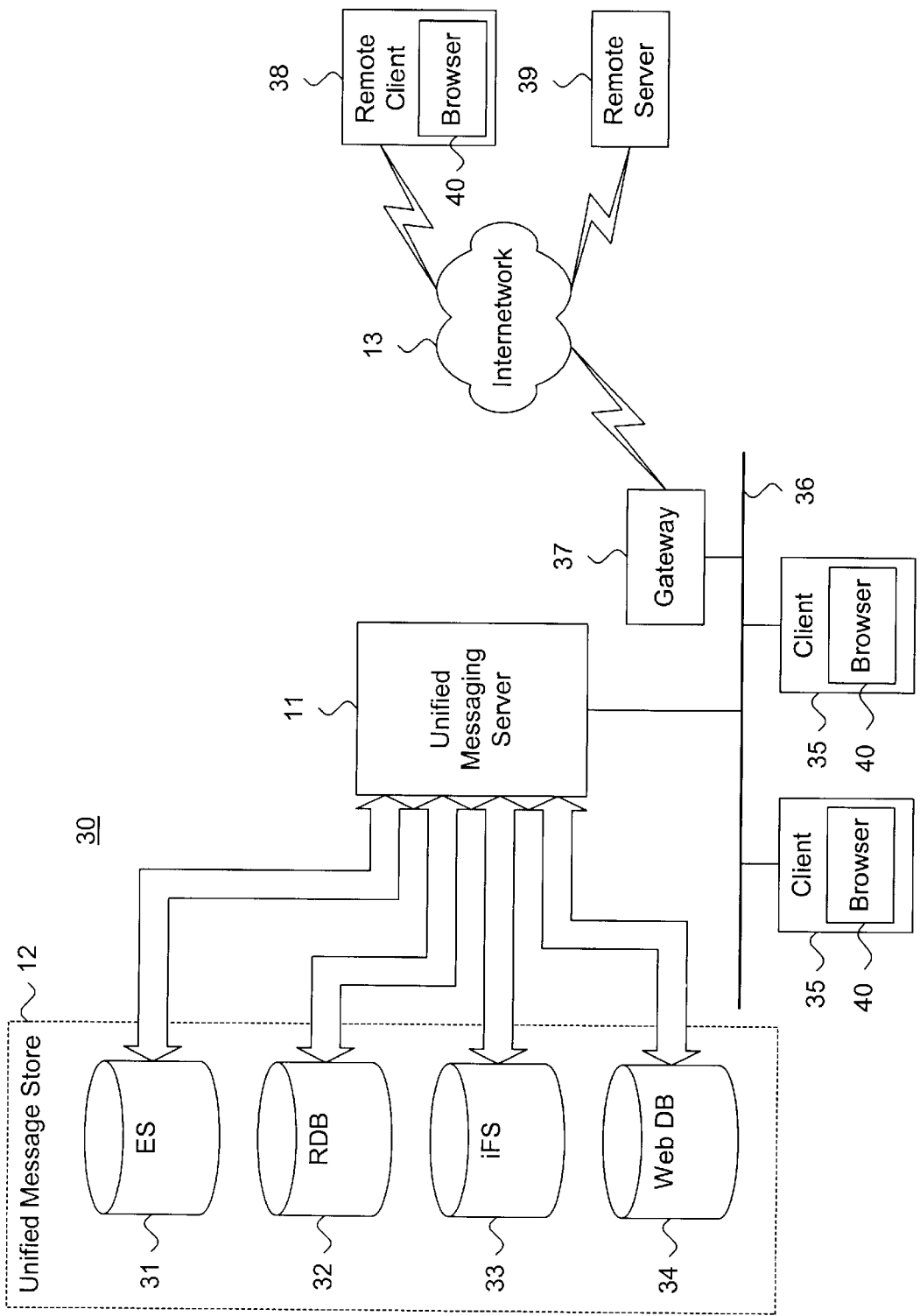
FIG. 2 is a network diagram showing the system for flexibly storing computer telephony messages of FIG. 1.

FIG. 2 is a network diagram showing the system 30 for flexibly storing computer telephony messages of FIG. 1. For simplicity, only computer system-type devices are shown, although other heterogeneous computer telephony devices are also supported, as described above with reference to FIG. 1. The unified messaging server 11 is coupled to a unified message store 12 supporting four types of individual message stores: an email store (ES) 31, a relational database (RDB) 32, an Internet file system (iFS) 33, and a Web database (Web DB) 34. Other databases or structural stores are possible, as would be recognized by one skilled in the art. Individual clients 35 can be connected to the unified messaging server 11 over an intranetwork 36. Similarly, remote clients 38 and remote servers 39 can be interconnected to the unified messaging server 11 over an internetwork 13, including the Internet, by way of a gateway 37. The clients 35, remote clients 38, and remote servers 39 can access the various stores in the unified message store 12 via the unified messaging server 11 for message retrieval and storage.

In the described embodiment, the unified messaging server 11 is structured as a Unified Inbox using the familiar graphical user interface and controls of a conventional email application, as further described below beginning with reference to FIG. 7. The Unified Inbox is implemented as Web pages interpreted by a browser application 40 executing on the clients 35 and remote client 36. The email store 31 is a flexible MIME-compliant mail store, with an extensible application programming interface support, as described in Oracle Email Server, Developer's Guide, Release 5.2, Oracle Corporation, Redwood Shores, Calif. (January 2001), the disclosure of which is incorporated by reference. The relational database 32 is a structured hierarchical database such as the Oracle relational database management system, Release 9i, licensed by Oracle Corporation, Redwood Shores, Calif. The Internet file system 33 and Web database 34 are also licensed by Oracle Corporation and are described in Oracle Internet File System, Developer's Guide, Release 1.1, Oracle Corporation, Redwood Shores, Calif. (September 2000), the disclosures of which are incorporated by reference.

The individual computer systems, including the unified messaging server 11, clients 35, remote client 38, and remote server 39, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 3:
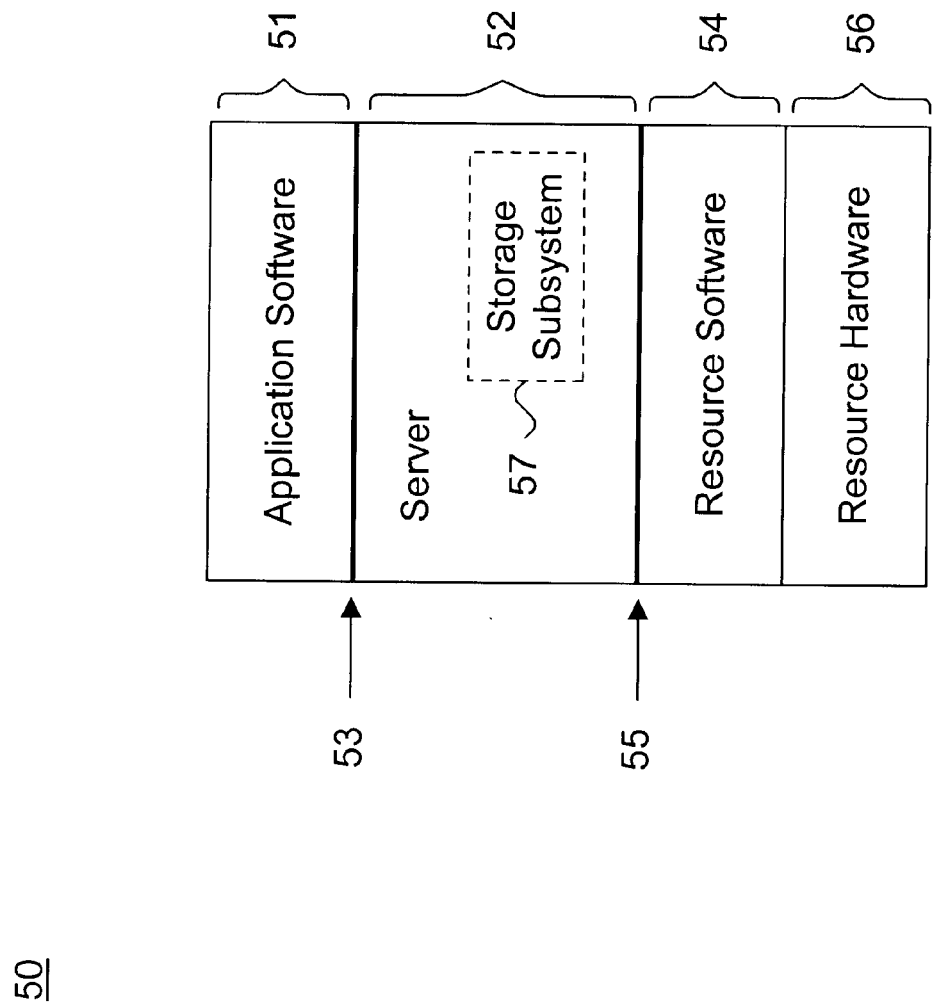
FIG. 3 is a block diagram showing the functional layers defined within the system of FIG. 1.

FIG. 3 is a block diagram showing the functional layers 50 defined within the telephone server 21 of FIG. 1. The unified messaging server 11 is a logical collection of individual servers which includes an Enterprise Computer Telephony Forum (ECTF)-based telephony server, architected into four logical layers: application software layer 51, server layer 52, resource software 54, and resource hardware layer 56. In the described embodiment, the server layer 52 is based on the telephony application objects framework, and ECTF S.100 compliant server model, licensed by Dialogic Corporation, Santa Clara, Calif. The server layer 52 provides an abstract layer server model that includes a messaging protocol to allow language and platform independent communications between heterogeneous computer telephony devices and end user applications, such as a Unified Inbox.

On the application software layer 51 side, the server layer 52 exports an application programming interface called the application interface adapter layer 53. This layer provides a request and response messaging interface between the application software layer 51 and the server layer 52, including functions for call control, media processing and control, and system servicing.

The application software layer 51 consists of individual end-user applications interfaced to the server layer 52 via the application interface adapter layer 53. By way of example, the applications include the browser-based Unified Inbox, as further described below beginning with reference to FIG. 7.

On the resource software layer 54 side, the server layer 52 exports an application programming interface called the resource software abstraction layer 55. This layer provides a set of dynamic linked libraries called service interface adapters between the server layer 52 and resource software layer 54, such as further described below with reference to FIG. 6A. Server request messages are converted into callbacks that control signal processing in heterogeneous computer telephony devices. Similarly, the resource software layer 54 can interface with the server layer 52 and application software layer 51 through request response and event messages.

The resource hardware layer 56 is specific to the computer telephony platform and interfaces only with computer telephony-capable hardware devices, such as telephone 17, facsimile 18, and cellular telephones 20 (all shown in FIG. 1), for application processing.

The functional layers 50 are further described in CT Media 2.0 Container Developer's Guide & Reference for Windows 2000, Dialogic Corporation, Santa Clara, Calif. (2000), the disclosure of which is incorporated by reference.

Computer telephony messages are maintained in the unified message store 12. The server layer 52 includes a storage subsystem 57 that provides an interface to the unified message store 12. All storage requests are received and processed through the server layer 52 by way of the storage subsystem 57. The storage subsystem 57 exports an application programming interface to the server layer 52 and to individual storage objects, as further described below with reference to FIG. 4.

The modules comprised in each layer are computer programs, procedures or modules written as source code in a conventional programming language, such as the C++ programming language, and are presented for execution by the CPU as object or byte code, as is known in the art. The various implementations of the source code and object and byte codes can be held on a computer-readable storage medium or embodied on a transmission medium in a carrier wave. The modules operate in accordance with a sequence of process steps, as further described below beginning with reference to FIGS. 6A–C.

Figure 4:
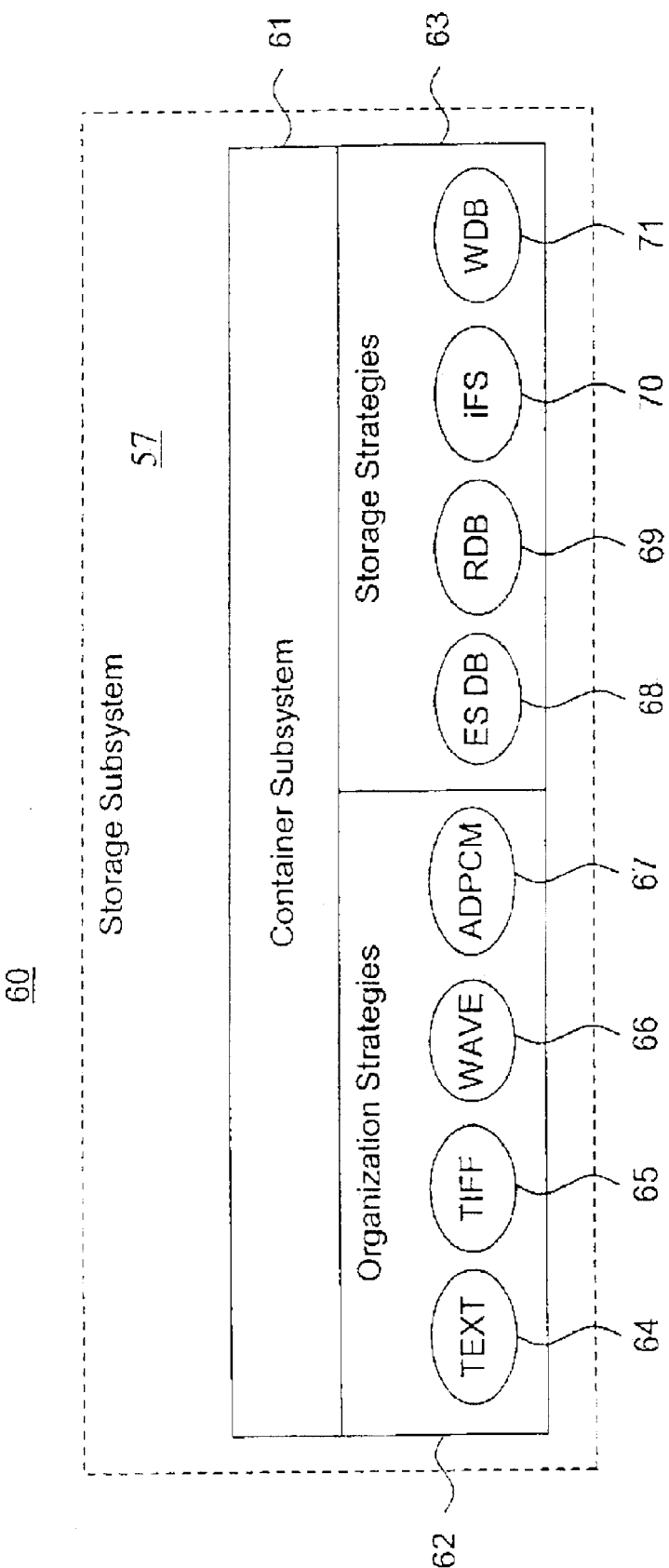
FIG. 4 is a block diagram showing the modules of the storage subsystem of FIG. 3.

FIG. 4 is a block diagram showing the modules 60 of the storage subsystem 57 of FIG. 3. The container subsystem 61 controls the information flow between the server layer 52 and the unified message store 12 (shown in FIG. 1). The storage subsystem 57 defines a container subsystem 61 that encapsulates individual structured storage objects logically maintained in the unified message store 12. The container subsystem 61 provides abstraction so that the underlying physical storage types are transparent to calling applications. And although each specific application will generally use only one of the storage types to store all messages, the storage subsystem 57 is capable of supporting all storage types.

Each storage object includes a data block and embedded organization strategy methods and storage strategy methods, such as described in the related commonly-assigned U.S. patent application Ser. No. 09/898,407, entitled "System And Method For Flexibly Storing Computer Telephony Messages As Structured Objects In A Unified Message Store," filed Jul. 3, 2001, pending, the disclosure of which is incorporated by reference. The storage subsystem 57 logically includes the container subsystem 61 that encapsulates the organization strategies 62 and storage strategies 63. The organization strategies 62 define and implement the functionality for processing various electronic messaging data types, as generated by the heterogeneous computer telephony devices. The storage strategies 63 implement the functionality for processing storage objects as physical storage types.

In the described embodiment, email messages have organization strategies 62 that are defined based on the type of data being stored. Email messages are stored using text-compliant organization strategies 64. Facsimile messages are stored using TIFF-compliant organization strategies 65. Audio and video messages are stored in one of either WAVE-compliant storage strategies 66 or ADPCM-compliant storage strategies 67. The structured storage objects are maintained in the unified message store 12 based on the type of storage system and include an email store storage strategy 68, a relational database storage strategy 71.

Each of the storage objects is indexed in the unified message store 12 using information common to all message types. FIG. 5 is a data structure of a pseudo code information header 75 for computer telephony messages stored in the unified message store 12 of FIG. 1. The information header 75 includes basic identification information to identify the sender ("From" field), recipient ("To" field), subject ("Subject" field), data type ("Type" field), date ("Date" field), message size ("Size" field), as well as the message content ("Body" field). For facsimile and voicemail messages, a binary large object ("Blob") field is included.

In the described embodiment, email messages are stored in a MIME compatible format, while facsimile and voicemail messages are stored in a VPIM format as described in RFC 2421, the disclosure of which is incorporated by reference.

Figure 6A:
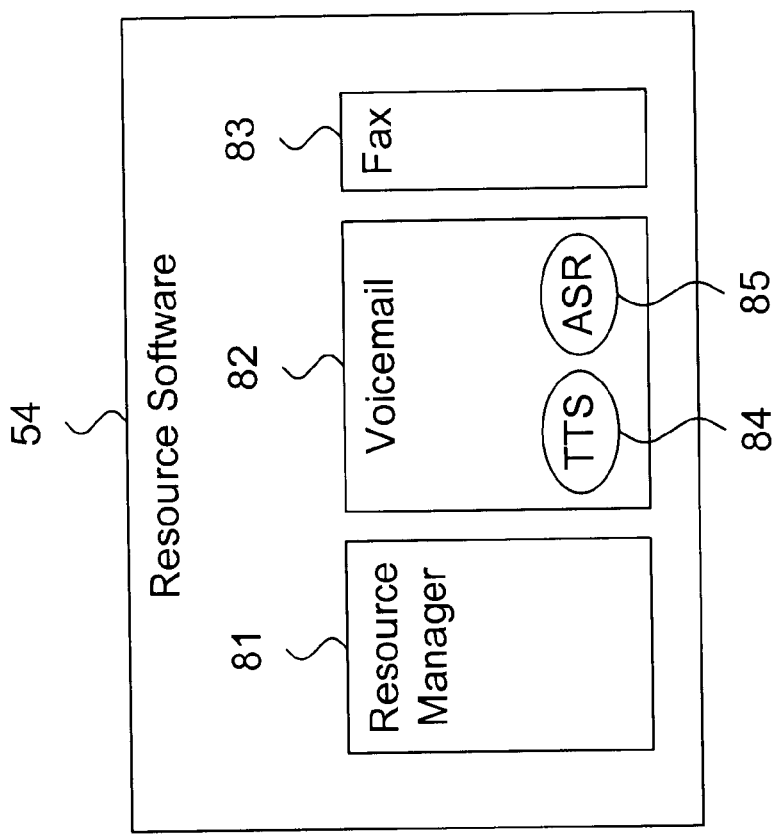
FIG. 6A is a block diagram showing the modules of the resource software layer of FIG. 3.

FIG. 6A is a block diagram showing the modules 80 of the resource software layer 54 of FIG. 3. A plurality of logically defined submodules 81–83 provide lower layer functionality by interfacing to the operating system, physical resources, and computer telephony devices, including telephones 17 and facsimiles 18. The resource manager 81 controls operating system calls and resource utilization on the client 35. The voicemail module 82 and fax module 83 provide resource-specific support.

In particular, the voicemail submodule 82 includes two service interface adapters, text-to-speech (TTS) 84 and automatic speech recognition (ASR) 85, for respectively converting written text into spoken words and converting spoken words into written text.

Figure 6B:
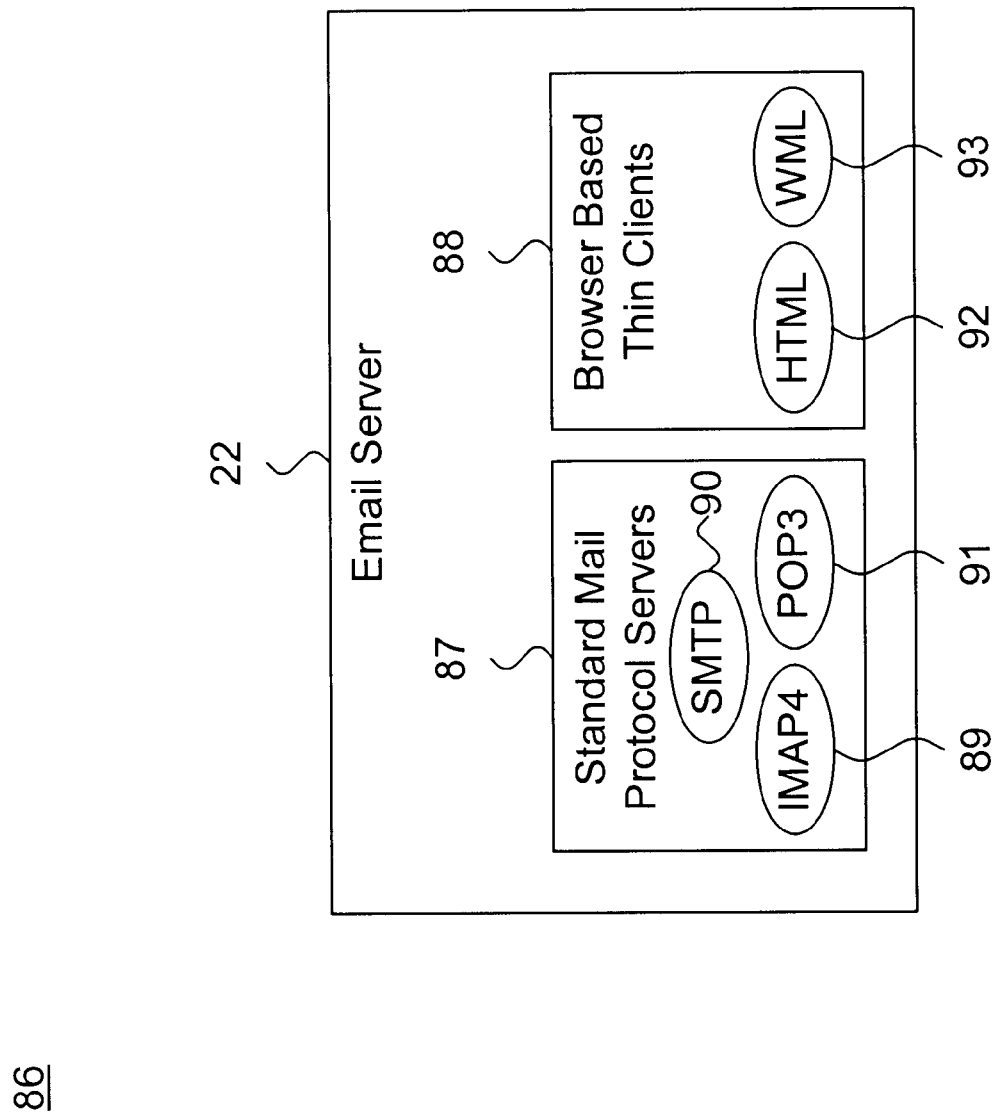
FIG. 6B is a block diagram showing the modules of the email server of FIG. 1.

FIG. 6B is a block diagram showing the modules 86 of the email server 22 of FIG. 1. A plurality of logically defined submodules 87–88 provide lower layer functionality by interfacing to the operating system, physical resources, and email devices, including computer systems 14 and personal data assistants 15. The submodules, including standard mail protocol servers 87 and browser-based thin clients 88, provide resource-specific support. The standard mail protocol servers submodule 86 is used by the browser-based thin clients submodule 88 to provide connections to the unified message store 12 (shown in FIG. 1).

In particular, the standard mail protocol servers submodule 87 includes three service interface adapters, Internet Message Access Protocol Version 4 (IMAP4) 89, Simple Mail Transfer Protocol (SMTP) 90, and Post Office Protocol Version 3 (POP3) 91, for respectively allowing a client to access email and route messages between email servers, such as described in R. Orfali, "Client/Server Survival Guide," pp. 411–416, John Wiley & Sons, Inc. (3d ed. 1999), the disclosure of which is incorporated by reference.

The browser based thin clients submodule 88 includes two service interface adapters, Hypertext Markup Language (HTML) 93 and Wireless Markup Language (WML) 94, for respectively generating content and a user interface for Web pages and WAP-enabled devices.

Figure 6C:
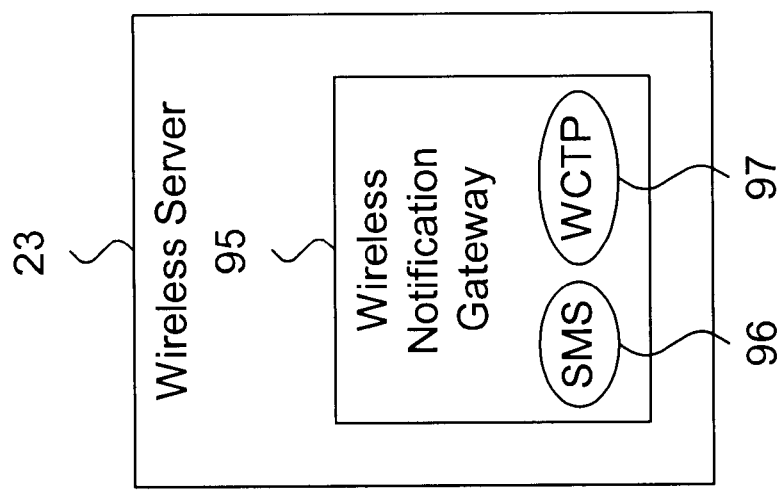
FIG. 6C is a block diagram showing the modules of the wireless server of FIG. 1.

FIG. 6C is a block diagram showing the modules 94 of the wireless server 23 of FIG. 1. A logically defined submodule 95 provides lower layer functionality by interfacing to the operating system, physical resources, and wireless devices, including pagers 19 and cellular telephones 20. The wireless notification gateway 95 provides resource-specific support and includes two service interface adapters, Short Messaging Service (SMS) 96 and Wireless Control Transfer Protocol (WCTP) 96, for respectively sending messages to SMS-capable and WCTP-capable devices.

Figure 7:
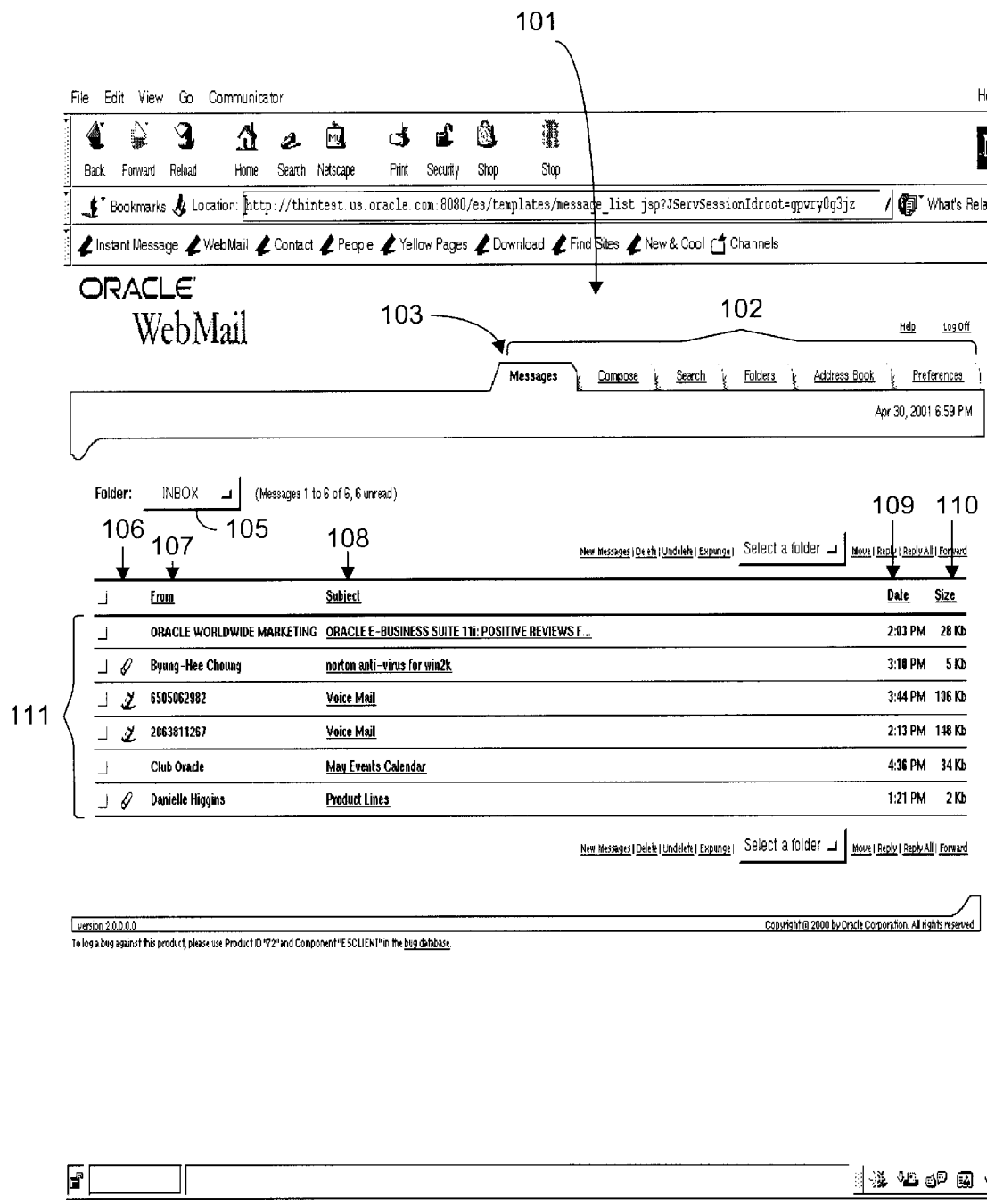
FIG. 7 is a screen shot of a Web page showing, by way of example, the graphical user interface used in the system of FIG. 2.

FIG. 7 is a screen shot of a Web page 100 showing, by way of example, the graphical user interface 101 used in the system 11 of FIG. 2. In the described embodiment, the graphical user interface 101 is generated as a HTML Web page for viewing on a browser application 40 (shown in FIG. 2). The graphical user interface 101 provides controls 102 for displaying and navigating through computer telephony messages 103 stored in the unified message store 12 (shown in FIG. 1).

A set of messages 111 is stored into a Unified Inbox 105 organized by type 106, sender 107, subject 108, date 109, and size 110. Access to computer telephony messages of different types is transparently handled through the email server 22. Facsimile, voicemail and video mail messages are included as attachments viewable with a text-based placeholder message. Access to voicemail and video mail messages causes an audio or video playback control to appear (not shown). Other forms of user controls are feasible. Depending on bandwidth availability, the playback control can be either download-based or streaming. Higher bandwidth connections will simply download an attachment for playback locally on the client while lower bandwidth connections will stream the playback to conserve bandwidth and save on download time. Although described above with reference to a Web interface, the graphical user interface 101 could also be provided as phone, PDA and wireless interfaces, as would be recognized by one skilled in the art.

Figure 8:
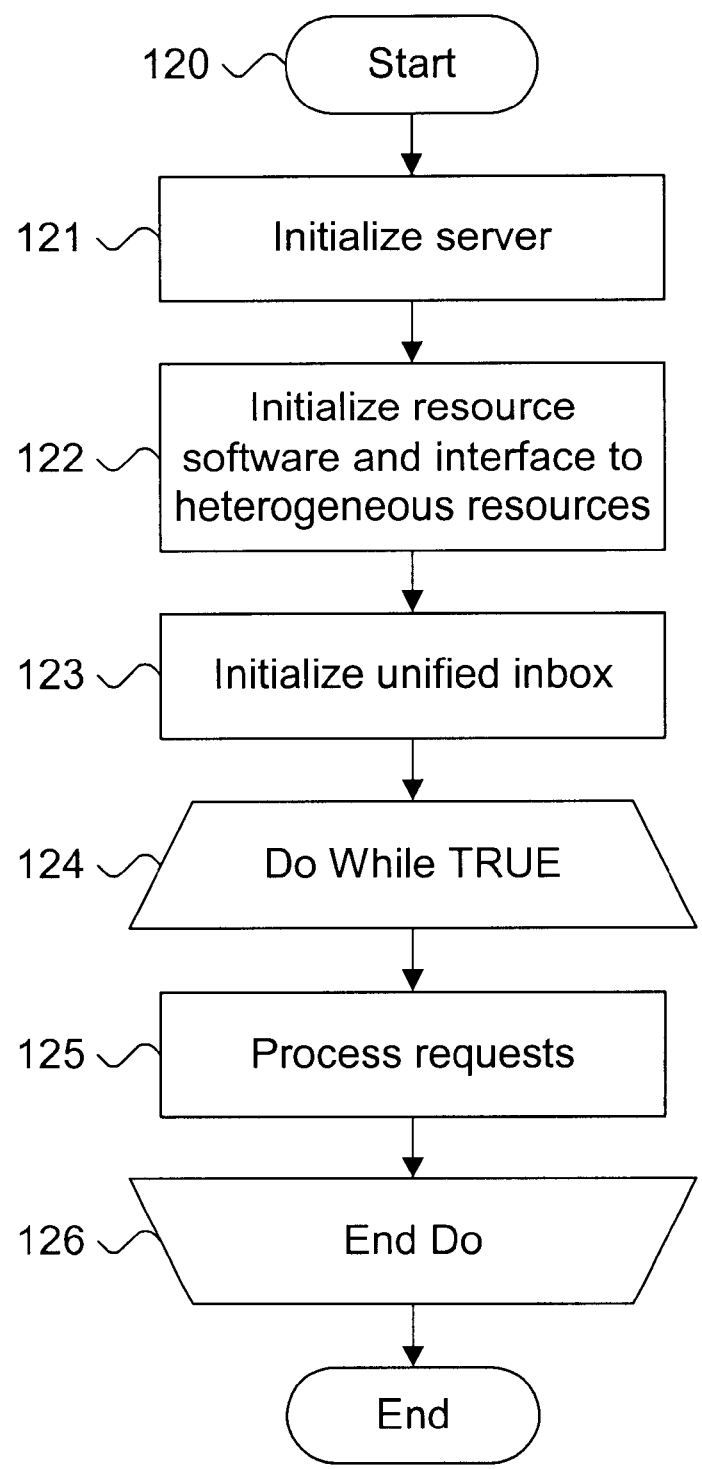
FIG. 8 is a flow diagram showing a method for providing access to a unified message store logically storing computer telephony messages, in accordance with the present invention.

FIG. 8 is a flow diagram showing a method 120 for providing access to a unified message store 12 (shown in FIG. 1) logically storing computer telephony messages, in accordance with the present invention. The graphical user interface 101 is generated by the unified messaging server 11 (shown in FIG. 2) as a Web page for presentation through a browser application 40. An end user on a client 35 or remote client 38 can display and navigate through a Unified Inbox 105 via the graphical user interface 101 and requests to access the computer telephony messages 103 are processed by the unified messaging server 11.

The Unified Inbox 105 is initialized (block 123) upon a first request for access to the Web page 100. Requests are then iteratively processed (block 125) in an iterative processing loop (blocks 124–126). During the processing of each request (block 125), the actual message formats used for each particular type of message, that is, email, voicemail, wireless and so forth, are transparent to the Unified Inbox 105 and access is provided by the encapsulated methods described above with reference to FIGS. 6A–6C. The routine terminates after all requests have been processed.

While the invention has been particularly shown and described as referenced to the embodiments thereof, those skilled in the art will understand that the foregoing and other changes in form and detail may be made therein without departing from the spirit and scope of the invention.

What is claimed is:

1. A method for managing heterogeneous messages, comprising the steps of:

receiving, at a unified digital server, digital messages from each of a plurality of heterogeneous sources, said digital messages including at least two members selected from the group consisting of:
  email,
  video mail without an email container,
  voice mail without an email container, and
  facsimiles without an email container;

storing said received digital messages as a first set of digital messages in a unified message store that is capable of managing a plurality of storage types;

wherein each storage type of said plurality of storage types represents a combination of an organization strategy and a storage strategy; and transmitting a set of information identifying a second set of digital messages to a client for presentation through a user interface, wherein the second set of digital messages is a subset of the first set of digital messages;

wherein the step of storing said received digital messages includes the steps of receiving digital messages that are associated with a first application at a container subsystem that presents an abstraction interface that renders transparent to said first application a first underlying storage type; and the container subsystem storing said digital messages associated with said first application using said first underlying storage type;

receiving digital messages that are associated with a second application at said container subsystem that presents said abstraction interface that renders transparent to said second application a second underlying storage type that is different than said first underlying storage type; and the container subsystem storing said digital messages associated with said second application using said second underlying storage type.

2. The method of claim 1, wherein the second set of digital messages includes messages from at least two distinct heterogeneous sources.

3. The method of claim 1, wherein said user interface is presented through one member selected from the group consisting of: a personal digital assistant, a wireless telephone with a graphical user interface, a wireless telephone without a graphical user interface, a wired telephone with a graphical user interface, a wired telephone without a graphical user interface, and a web page.

4. The method of claim 1, further comprising the steps of:

upon receiving a command to transmit a particular message in the second set of digital messages, downloading the particular message to a client only if said client has a bandwidth capability that currently supports downloading messages; and upon receiving a command to transmit a particular message, streaming the particular message to the client only if said bandwidth capability does not currently support downloading messages.

5. The method of claim 4, wherein said particular message is voice mail.

6. The method of claim 4, wherein said particular message is video mail.

7. The method of claim 1, wherein each of said storage strategy associated with each of said storage type includes one member selected from the group consisting of: an email server database strategy, a relational database strategy, an Internet file system strategy, and a web database strategy.

8. A computer-readable medium carrying one or more sequences of instructions which, when executed by one or more processors, causes the one or more processors to perform the method recited in any one of claims 1–7.

* * * * *

UNITED STATES PATENT AND TRADEMARK OFFICE
CERTIFICATE OF CORRECTION

PATENT NO.    : 6,661,877 B1
DATED         : December 9, 2003
INVENTOR(S)   : Jae Jun Lee et al.

It is certified that error appears in the above-identified patent and that said Letters Patent is hereby corrected as shown below:

<u>Column 8,</u>
Line 36, "server digital," should read -- server comprising a plurality of different media servers, digital --;
Line 45, "store that," should read -- store comprising a plurality of different message stores that --.

Signed and Sealed this

Twenty-fifth Day of May, 2004

JON W. DUDAS
*Acting Director of the United States Patent and Trademark Office*